Sept. 29, 1964   J. A. BROWN   3,150,557
BOLT LOADING INDICATOR
Filed Feb. 5, 1962   2 Sheets-Sheet 1
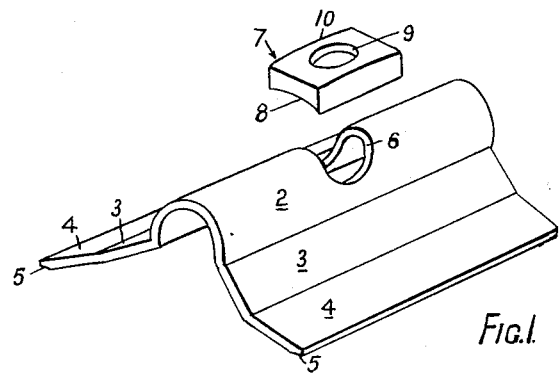
Fig.1.
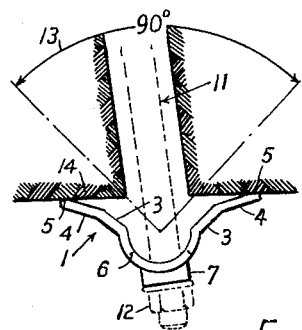
Fig.2.
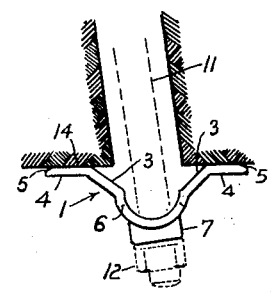
Fig.3.
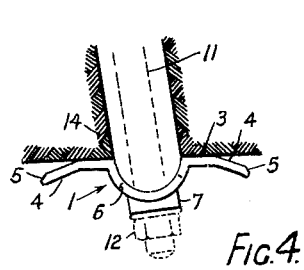
Fig.4.
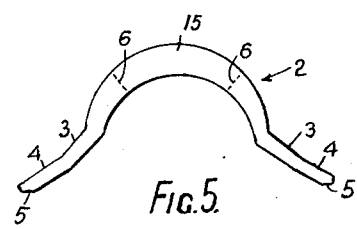
Fig.5.
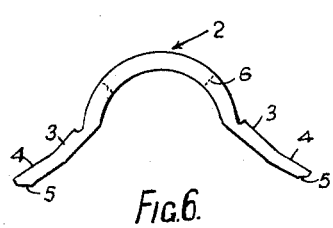
Fig.6.
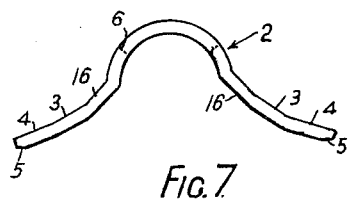
Fig.7.
INVENTOR
JOHN A. BROWN Sept. 29, 1964  J. A. BROWN  3,150,557
BOLT LOADING INDICATOR
Filed Feb. 5, 1962  2 Sheets-Sheet 2
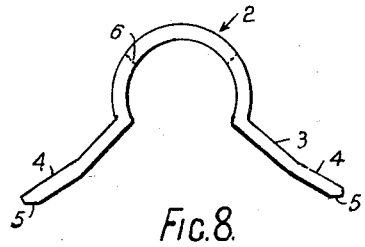
Fig.8.
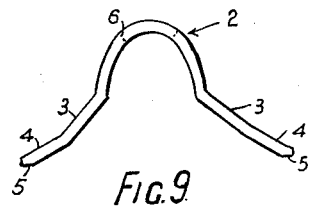
Fig.9.
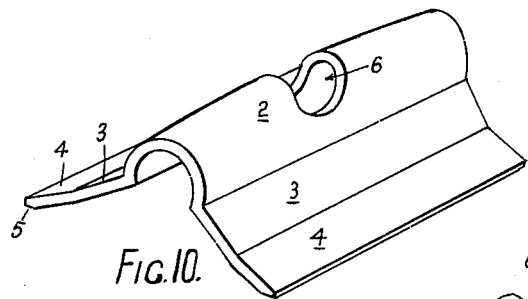
Fig.10.
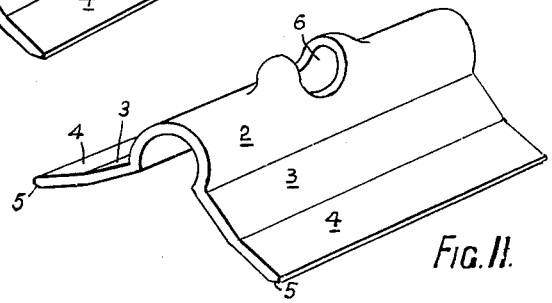
Fig.11.
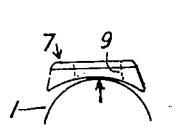
Fig.12.
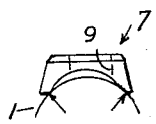
Fig.13.
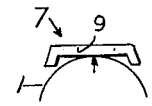
Fig.14.
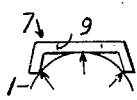
Fig.15.
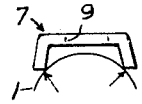
Fig.16.
INVENTOR
JOHN A. BROWN
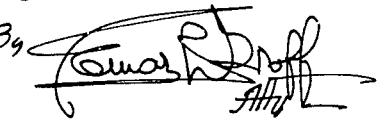

United States Patent Office 3,150,557
Patented Sept. 29, 1964

3,150,557
BOLT LOADING INDICATOR
John Arthur Brown, 52 Rainbow Ave., South Broken Hill, New South Wales, Australia
Filed Feb. 5, 1962, Ser. No. 171,165
Claims priority, application Australia, June 13, 1961, 5,694/61
1 Claim. (Cl. 85—62)

This invention has been devised to provide a bolt loading (tension) indicator for mounting on a bolt under its nut and which is adaptable to any angle (within practical limits) at which the bolt may be located relative to the face against which the bolt loading is to be applied. This bolt loading indicator will give a visual indication of a determined loading applied by a bolt irrespective of the force required to apply such loading. This bolt loading indicator is particularly useful in the mining industry but the scope of the invention is not limited solely to such use.

This bolt loading indicator is made of a plate capable of deforming under a load and either remaining deformed or recovering when the load is removed (preferably of steel or a material having characteristics similar to steel) having formed therein a corrugation which extends throughout the length or the breadth thereof and having the walls of the corrugation extended to form outwardly obliquely set flats on each side thereof. A bolt slot is formed through and across the crest of the corrugation. A hole may be substituted for the slot.

The bolt loading indicator is placed on a bolt over an article to be held by the bolt with the obliquely set flats in contact with the article. The pressure applied by the bolt to the article is indicated by the position of the obliquely set flats on the article.

A saddle may be provided for slidably mounting on the corrugation over the slot. The saddle has a hole through which the bolt can pass and a contact face for a nut on the bolt.

The invention is described in further detail with reference to the annexed drawings, wherein:

FIG. 1 is a perspective view of a bolt loading indicator according to one embodiment of the invention including the saddle.

FIGS. 2 and 3 and 4 are diagrammatic views of the bolt loading indicator of FIG. 1 mounted on a bolt on an article and showing; (FIG 2) no loading on the bolt; (FIG. 3) correct loading on the bolt; (FIG. 4) overloading on the bolt.

FIGS. 5 to 9 inclusive are elevations and FIGS. 10 and 11 are perspective views of modifications of the bolt loading indicator. FIGS. 12 to 16 inclusive are schematic elevations of various forms of saddles.

In order to fully understand the need for a bolt loading indicator, a brief description of the practical aspects of roof-bolting or rock-bolting in underground excavations is given below.

Bolting of the roof and/or walls of an underground excavation or passageway is undertaken in order to reinforce the material so that it acts as a quasi-elastic diaphragm of material or as a bonded laminated beam. It is possible by means of such bolting to tie together a series of bedded strata or fractured mass of material so as to form one strong thick bed or beam. Previous to the use of such bolts, it was necessary to prop back the roof and/or other parts of the excavation by masses of timber.

However, for the bolting practice to be effective it has been proved and is recognised that there are some criteria which must be maintained.

(a) The anchorage of the bolt must be positive (the anchorage is beyond the scope of this invention).

(b) There should be positive and determined bearing between the nut or head of the bolt and the ground (article) it is supporting.

(c) Every bolt must be uniformly tensioned so that a uniformly compressed diaphragm of material is achieved.

Referring to FIGS. 1 to 4 the indicator plate 1 has a corrugation 2 formed therein and extending the length thereof. From each side of the corrugation the plate is set outwardly forming two obliquely angular flats 3 and 4, which extend the length thereof. The contact longitudinal edges of the flats 4 are bevelled as indicated at 5.

The angular set of the flats 3 and 4 is determined by the thickness and length of the plate 1 and the loading which is to be applied and the size of the corrugation 2 is determined by the size of the bolt (and the loading thereon) with which the indicator is to be used. A bolt slot 6 is formed through and across the corrugation.

The saddle illustrated in FIG. 1 is a block 7 having its bottom face 8 concaved to such radius that it can sit on the corrugation 2. It can move transversely on the corrugation 2 to such extent as is necessary to provide a base for a bolt nut at any angle within the limits of the bolt slot 6. There is a bolt hole 9 through the center and the face 10 is made slightly convex in the line of the corrugation 2.

In use the indicator plate 1 with its saddle 7 are placed on a bolt 11 anchored in and projecting from the article to be secured by the bolt. Preferably a washer is placed over the saddle 7 and a nut 12 is then screwed on to the bolt. The bolt moves through the slot 6 to conform to the angles the indicator plate takes when its angular flats 4 abut the article.

FIG. 2 shows the parts assembled prior to pressure being applied by screwing the nut 12 against the saddle 7. FIG. 2 also shows, as indicated at 13 a practical length of the bolt slot 6 which will permit an angular range of 90° of bolt settings to which the indicator plate 1 can be applied. As pressure is applied the angle flats 4 are gradually forced into flat contact with article indicated at 14 by the spreading movement of the indicator plate 1. The bevelled edge 5 prevents the indicator plate 1 digging into the article 14. The correct loading of the bolt 11 is clearly indicated when the flats 4 of the indicator plate 1 are flush with the face of the article as shown in FIG. 3. In the event of a loading being applied to the bolt 11 in excess of a determined loading, the flats 4 of the indicator plate 1 will move away from the face of the article and the flats 3 will contact the face of the article as shown in FIG. 4. It will be seen that the indicator plate will give a clear visual indication of all phases of the loading applied by a bolt irrespective of the force required to turn the nut.

Once the advantages of this bolt loading indicator are understood many variations of its construction for particular applications will become apparent to those skilled in the art to which the invention appertains. Examples of such variations within the scope of the invention will now be described with reference to FIGS. 5 to 16 of the drawings. In these figures the references used are, as far as is practicable, the same as those used in connection with FIGS. 1 to 4.

In FIG. 5 the corrugation increases in thickness as indicated at 15 from its junction with the obliquely set flats 3. In another variation the corrugation 2 could be made thinner than the obliquely set flats 3.

In FIG. 6 the obliquely set flats 3 have their thickness increased in comparison with the corrugation 2. Alternatively the obliquely set flats 3 could be made thinner.

In FIG. 7 additional obliquely set flats 16 are incorporated. The number of such obliquely set parts to be incorporated is determined by the indications required of various bolt loadings.

FIGS. 8 and 9 show how the shape of the corrugation 2 and the angle of the obliquely set flats 3 can be varied to meet particular requirements.

FIGS. 10 and 11 show how the longitudinal contour of the corrugation 2 can be altered to accommodate variations in the angle of a bolt relative to the longitudinal plane of the indicator plate when in contact with an article.

FIGS. 12 to 16 show variations in the contour of the saddle which can be made to provide a desired contact with the indicator plate 1.

I claim:

A one piece bolt loading indicator comprising,
- an elongated rectangular yieldable steel plate having a medial corrugation formed therein extending throughout from one opposite edge to the other, said corrugation being concave-convex in cross-section,
- at least two outwardly set flat surfaces on each side of the corrugation extending downwardly from the concave side thereof substantially throughout the longitudinal extent of said corrugation with the junctions between said flat surfaces and said corrugation and the junctions between the adjacent flat surfaces defining obtuse angles, said angles being less than 180° on the outer surface of the plate, the longitudinal workpiece engaging edges of the outermost of the obliquely set flat surfaces being beveled,
- said flat surfaces being adapted successively to contact an article to be secured by a bolt according to the loading applied to the indicator by the bolt,
- and a bolt slot formed through and across the crest of the corrugation, said bolt slot being of a length to permit an angular range of 90° of bolt settings.

References Cited in the file of this patent

UNITED STATES PATENTS

| | | |
|---|---|---|
| 1,904,296 | Royse | Apr. 18, 1933 |
| 1,952,600 | McComb | Mar. 27, 1934 |
| 2,850,937 | Ralston | Sept. 9, 1958 |

FOREIGN PATENTS

| | | |
|---|---|---|
| 1,222,640 | France | Jan. 25, 1960 |